(12) United States Patent
Kurematsu (10) Patent No.: US 10,107,369 B2
(45) Date of Patent: Oct. 23, 2018

(54) CHAIN TENSIONER

(71) Applicant: TSUBAKIMOTO CHAIN CO., Osaka-shi, Osaka (JP)

(72) Inventor: Yuji Kurematsu, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 145 days.

(21) Appl. No.: 15/348,067

(22) Filed: Nov. 10, 2016

(65) Prior Publication Data

US 2017/0138443 A1    May 18, 2017

(30) Foreign Application Priority Data

Nov. 16, 2015    (JP) .................................. 2015-224045

(51) Int. Cl.
*F16H 7/08* (2006.01)

(52) U.S. Cl.
CPC ......... *F16H 7/0848* (2013.01); *F16H 7/0838* (2013.01); *F16H 2007/0806* (2013.01); *F16H 2007/0814* (2013.01); *F16H 2007/0853* (2013.01); *F16H 2007/0859* (2013.01); *F16H 2007/0872* (2013.01); *F16H 2007/0893* (2013.01)

(58) Field of Classification Search
CPC ................. F16H 7/0848; F16H 7/0838; F16H 2007/0814; F16H 2007/0853; F16H 2007/0859; F16H 2007/0872
USPC ......................................... 474/110, 111, 140
See application file for complete search history.

(56) References Cited

U.S. PATENT DOCUMENTS

| | | | | | |
|---|---|---|---|---|---|
| 4,507,103 | A | * | 3/1985 | Mittermeier | .......... F16H 7/0836 474/110 |
| 5,879,256 | A | * | 3/1999 | Tada | .......... F16H 7/08 474/110 |
| 5,993,342 | A | * | 11/1999 | Wigsten | .......... F16H 7/08 474/110 |
| 6,398,682 | B1 | * | 6/2002 | Suzuki | .......... F16H 7/08 474/110 |
| 6,634,973 | B1 | * | 10/2003 | Simpson | .......... F16H 7/0848 474/109 |

(Continued)

FOREIGN PATENT DOCUMENTS

JP    11-22792 A    1/1999

*Primary Examiner* — Michael R Mansen
*Assistant Examiner* — Mark K Buse
(74) *Attorney, Agent, or Firm* — Westerman, Hattori, Daniels & Adrian, LLP (57) ABSTRACT

To provide a chain tensioner capable of constantly providing an appropriate reaction force and damping characteristics for a variety of tension fluctuations irrespective of chain elongation, and capable of accommodating the tension fluctuations. The chain tensioner includes a distal end plunger 130 slidably inserted in a distal end bore 121 of a plunger 120, and a distal end biasing means 141 accommodated inside a second oil pressure chamber 102 such as to be able to expand and contract and to urge the distal end plunger 130. The chain tensioner further includes a check valve unit 150 that stops oil flowing from an oil pressure chamber 101 into the second oil pressure chamber 102, and a first relief valve unit 160 that releases oil toward the oil pressure chamber 101 when the pressure reaches or exceeds a predetermined high level.

5 Claims, 8 Drawing Sheets

(56) References Cited

U.S. PATENT DOCUMENTS

| | | | |
|---|---|---|---|
| 6,716,124 B2* | 4/2004 | Markley | F16H 7/0848 |
| | | | 474/109 |
| 9,360,088 B2* | 6/2016 | Todd | F16H 7/08 |
| 9,605,732 B2* | 3/2017 | Smith | F16H 7/0848 |
| 2009/0111628 A1* | 4/2009 | Poiret | F16H 7/0848 |
| | | | 474/110 |

* cited by examiner

Prior Art

Fig. 8

Prior Art

CHAIN TENSIONER

BACKGROUND OF THE INVENTION

1. Field of the Invention

The present invention relates to a chain tensioner that includes a tensioner body having a cylindrical plunger bore with one open end, a cylindrical plunger slidably inserted in the plunger bore, and biasing means accommodated inside an oil pressure chamber formed between the plunger bore and the plunger such as to freely expand and contract and to urge the plunger in a projecting direction, and that maintains appropriate tension of a chain.

2. Description of the Related Art

It has been common practice to use a chain tensioner for maintaining appropriate tension of a chain. For example, a chain guide mechanism has been known, which slidably guides, by means of a guide shoe, a transmission chain such as an endless roller chain passing over respective sprockets of a crankshaft and a cam shaft inside an engine room, and which uses a chain tensioner to press a pivoting chain guide having the guide shoe to maintain appropriate tension.

Figure 7:
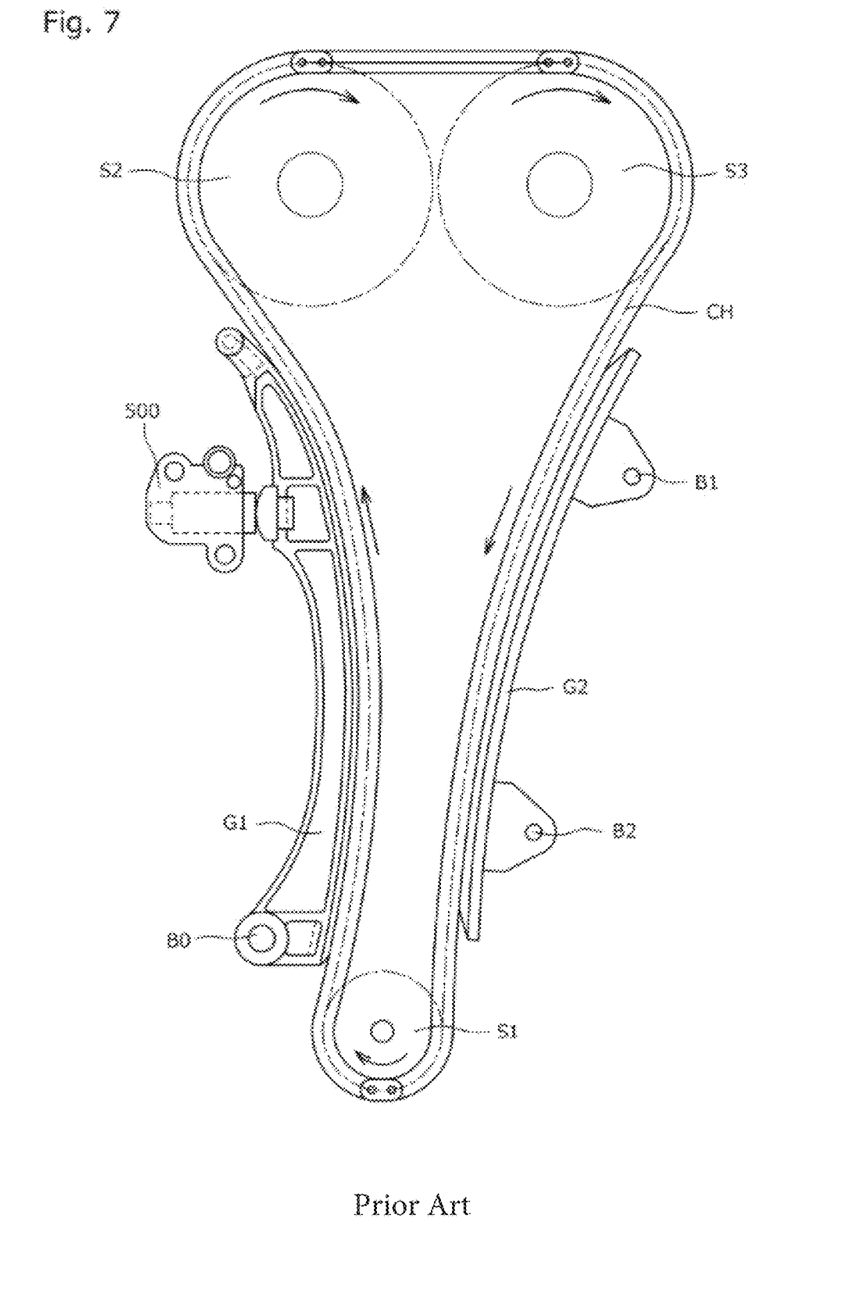
FIG. 7 is an illustrative diagram of the chain tensioner used in a chain guide mechanism of an engine.

A chain guide mechanism is configured as shown in FIG. 7, for example, wherein a pivoting chain guide G1 and a fixed chain guide G2 guide an endless timing chain CH passing over a drive sprocket S1 of a crankshaft and a pair of driven sprockets S2 and S3 or cam shafts inside an engine room.

The fixed chain guide G2 is fixed in position in the engine room with two mounting shafts B1 and B2, while the pivoting chain guide G1 is attached such as to be pivotable around the mounting shaft B0 in the plane in which the timing chain CH runs in the engine room.

A chain tensioner 500 presses the pivoting chain guide G1 and thereby maintains the tension of the timing chain CH at an appropriate level as well as reduces its vibration.

Figure 8:
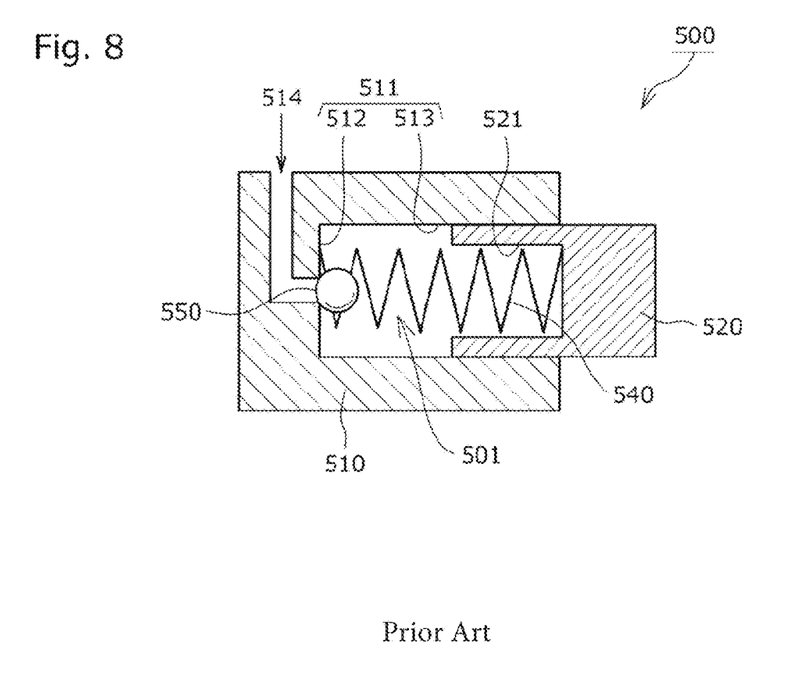
FIG. 8 is a schematic illustrative diagram of a conventional chain tensioner.

The known chain tensioner 500 used in such a chain guide mechanism includes, for example, as shown schematically in FIG. 8, a tensioner body 510 having a cylindrical plunger bore 511 with one open end, a cylindrical plunger 520 inserted in the plunger bore 511 to freely slide against a cylindrical surface 513 of the plunger bore 511, and means for biasing the plunger 520 in a projecting direction from the plunger bore 511.

The biasing means is formed by a coil spring 540 accommodated inside a cylindrical recess 521 in the cylindrical plunger 520 and compressed between the plunger and a bottom part 512 of the plunger bore 511.

Oil is supplied from, an oil supply hole 514 formed in the plunger bore 511, so that an oil pressure chamber 501 formed between the plunger bore 511 and the plunger 520 is filled with the oil, which oil urges the plunger 520 in a projecting direction. A check valve 550 (schematically shown as a check ball) stops the oil from flowing out from the oil supply hole 514.

As the plunger 520 thereby reciprocates, the oil flows through a small gap between the plunger 520 and the plunger bore 511, and the flow resistance provides the damping effect, of slowing down the reciprocal movement of the plunger 520.

SUMMARY OF THE INVENTION

In such a chain tensioner, how much reaction force is required of the coil spring 540 depends on the engine. When there is a worry that rattling of the chain occurs at the start of the engine, a large reaction force is required.

A large reaction force is needed also when the chain has elongated due to aging, but this reaction force is excessive for the chain that has not elongated yet.

Therefore, the tensioner 500 inevitably had to press the chain with a force more than necessary, because of which friction properties between the chain and its running surface were deteriorated, and engine fuel economy was compromised.

The chain is also subjected to tension fluctuations that occur in accordance with the engine rpm and changes in the load. Since the cycle and amplitude of tension fluctuations vary depending on driving conditions, the plunger reciprocates in various cycles and at various speeds to absorb the tension fluctuations.

The reaction force of the coil spring 540 is determined in accordance with a predetermined spring constant and depending on the position of the plunger 520. The damping effect is also determined by the speed of the plunger 520. Therefore, it was difficult to always achieve an appropriate reaction force and damping characteristics for a variety of tension fluctuations, and, in some driving conditions, resonance could occur or the tension fluctuations could be amplified.

To mitigate these problems, one known chain tensioner includes a nose portion provided at the tip of the plunger via a second spring (50) or the like in addition to the biasing means (first spring 40) inside an oil pressure chamber (fluid chamber 22) so as to absorb sudden tension fluctuations with this second spring (see Japanese Patent Application Laid-open No. H11-22792, etc).

However, with the technique described in Japanese Patent Application Laid-open No. H11-22792, the second spring and associated components are provided outside the oil pressure chamber so that no hydraulic damping effect can be achieved. The spring only follows the vibration caused by tension fluctuations of the chain and has little effect of damping the vibration. There was thus a possibility that the vibration might be amplified due to resonance and the like depending on the driving condition.

It is an object of the present invention is to solve these problems and to provide a chain tensioner capable of constantly providing an appropriate reaction force and damping characteristics for a variety of tension fluctuations irrespective of chain elongation, and capable of accommodating the tension fluctuations without causing resonance-induced vibration or the like.

The chain tensioner of the present invention includes: a tensioner body having a cylindrical plunger bore with one open end; a cylindrical plunger slidably inserted in the plunger bore; and biasing means accommodated inside an oil pressure chamber formed between the plunger bore and the plunger such as to freely expand and contract and to urge the plunger in a projecting direction. The plunger has a distal end bore that opens toward a distal end, and includes a cylindrical distal end plunger slidably inserted in the distal end bore, and distal end biasing means accommodated inside a second oil pressure chamber formed between the distal end bore and the distal end plunger such as to be able to expand and contract and to urge the distal end plunger in a projecting direction. The chain tensioner further includes a check valve unit that stops reverse flow of oil flowing from the oil pressure chamber into the second oil pressure chamber; and a first relief valve unit that releases oil toward the oil pressure chamber when pressure of the second oil pressure chamber reaches or exceeds a predetermined high level. The problems described above are thereby solved.

In the chain tensioner according to claim 1, the plunger has a distal end bore that opens toward a distal end, and includes a cylindrical distal end plunger slidably inserted in the distal end bore, and distal end biasing means accommodated inside a second oil pressure chamber formed between the distal end bore and the distal end plunger such as to be able to expand and contract and to urge the distal end plunger in a projecting direction. The chain tensioner further includes a check valve unit that stops reverse flow of oil flowing from the oil pressure chamber into the second oil pressure chamber, and a first relief valve unit that releases oil toward the oil pressure chamber when pressure of the second oil pressure chamber reaches or exceeds a predetermined high level. Therefore, the plunger and the distal end plunger can both be designed to provide an appropriate reaction force and damping characteristics with their reciprocal movements.

This way, the chain tensioner can constantly provide appropriate reaction forces and damping characteristics for a variety of tension fluctuations irrespective of chain elongation, and accommodate the tension fluctuations without causing resonance-induced vibration or the like.

According to the configuration set forth in claim 2, the distal end biasing means has a larger pressing force than that of the biasing means, and the plunger is restricted from moving in a retracting direction by a ratchet mechanism. A forward movement of the plunger in accordance with chain elongation or the like is effected by the pressing force of the biasing means, while the backward movement of the plunger is restricted by the ratchet mechanism, so that the reaction forces for large tension fluctuations can be provided by the distal end biasing means and applied by reciprocal movement of the distal end plunger.

This way, the distal end plunger of a small mass provides an appropriate reaction force and damping characteristics as it reciprocates and follows a variety of tension fluctuations during the driving irrespective of chain elongation. With a stable reaction force and damping characteristics, the distal end plunger follows the tension fluctuations with better response and can accommodate tension fluctuations without causing resonance-induced vibration or the like.

In the conventional technique that uses a ratchet mechanism, the plunger reciprocates by an amount of backlash of the ratchet mechanism to follow tension fluctuations during driving. In contrast, in the configuration set forth in claim 2, the distal end plunger reciprocates to follow the fluctuations, so that the ratchet mechanism need not be provided with a large backlash and can have improved durability.

According to the configuration set forth in claim 3, the check valve unit is disposed as a valve element of the first relief valve unit, and the first relief valve unit and the check valve unit are formed integral with each other.

Therefore, even though the relief valve unit and the check valve unit are assembled into the plunger, they do not cause the tensioner to become bulky, and do not cause an increase in the number of parts to be machined.

The first relief valve unit and the check valve unit are formed integral with each other, and the first relief valve unit, is disposed between the oil pressure chamber and the second oil pressure chamber with its relief valve seat being oriented toward the second oil pressure chamber. Therefore, after the first relief valve unit has been assembled to the check valve unit, they can be assembled as one piece into the tensioner, so that the number of assembling steps can be reduced.

According to the configuration set forth in claim 4, an oil circulation passage formed between an outer circumference of the first relief valve unit and an inner surface of the plunger includes an orifice that restricts an amount of oil. Therefore, even when the pressure of the second oil pressure chamber has exceeded the valve opening pressure of the first relief valve unit, the pressure of the second oil pressure chamber and the damping characteristics are maintained within a predetermined range because of the orifice, so that it is possible to constantly provide appropriate reaction forces and damping characteristics for a wider variety of tension fluctuations.

According to the configuration set forth in claim 5, the second oil pressure chamber includes a second relief valve unit that releases oil when the pressure of the second oil pressure chamber reaches or exceeds a predetermined high level, and the second relief valve unit has a higher valve opening pressure than that of the first relief valve unit. Therefore, when the tension becomes too high, the second relief valve unit opens, so that application of an excessive load on the chain can be avoided, in particular, during high speed rotation of the engine.

DESCRIPTION OF THE PREFERRED EMBODIMENTS

Embodiment 1

A chain tensioner 100 and a first relief valve unit 160 according to a first embodiment of the present invention will be described with reference to the drawings.

Figure 1:
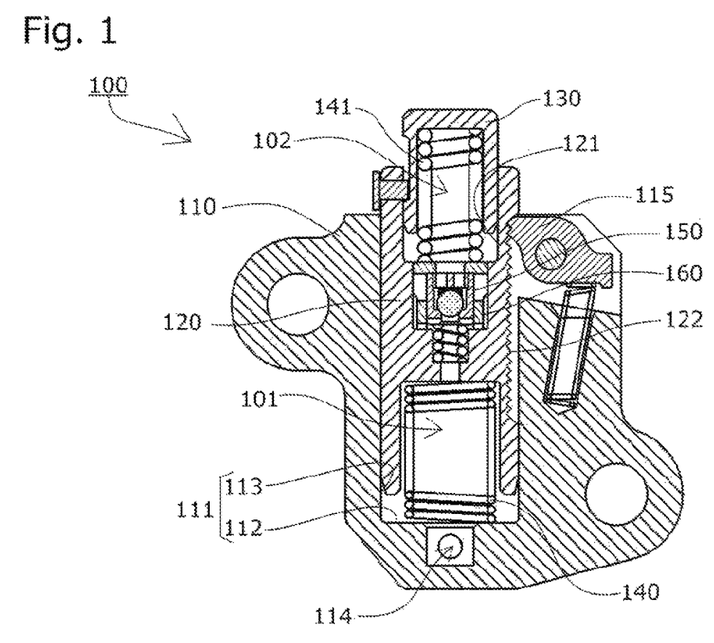
FIG. 1 is a cross-sectional view of a chain tensioner according to a first embodiment of the present invention.

The chain tensioner 100 includes, as shown in FIG. 1, a tensioner body 110 having a cylindrical plunger bore 111 with one open end, a cylindrical plunger 120 slidably inserted in the plunger bore 111, and a coil spring 140 that is biasing means accommodated inside an oil pressure chamber 101 formed between the plunger bore 111 and the plunger 120 such as to be able to expand and contract and to urge the plunger 120 in a projecting direction.

An oil supply hole 114 is formed in the bottom surface of the plunger bore 111 for supplying oil from outside to the oil pressure chamber 101.

The plunger 120 includes a distal end bore 121 that opens toward the distal end, a cylindrical distal end plunger 130 slidably inserted in the distal end bore 121, and a second coil spring 141 that is distal end biasing means accommodated inside a second oil pressure chamber 102 formed between the distal end bore 121 and the distal end plunger 130 such as to be able to expand and contract and to urge the distal end plunger 130 in a projecting direction.

Between the oil pressure chamber 101 and the second oil pressure chamber 102 are provided a check valve unit 150 that stops reverse flow of oil flowing from the oil pressure chamber 101 into the second oil pressure chamber 102, and a first relief valve unit 160 that releases oil toward the oil pressure chamber 101 when the pressure of the second oil pressure chamber 102 reaches or exceeds a predetermined high level.

Ratchet teeth 122 are formed along a longitudinal direction on the outer surface of the plunger 120. The ratchet teeth engage with a pivotable ratchet pawl 115 provided to the tensioner body 110 and make up a ratchet mechanism.

This ratchet mechanism allows movement of the plunger 120 in an advancing direction, as the ratchet pawl 115 rides over the ratchet teeth 122, but restricts movement of the plunger 120 in a backward direction, since the ratchet pawl 115 cannot ride over the ratchet teeth 122 in that direction.

The second coil spring 141 that urges the distal end plunger 130 is designed to apply a larger pressing force than the coil spring 140 that presses the plunger 120.

Figure 2:
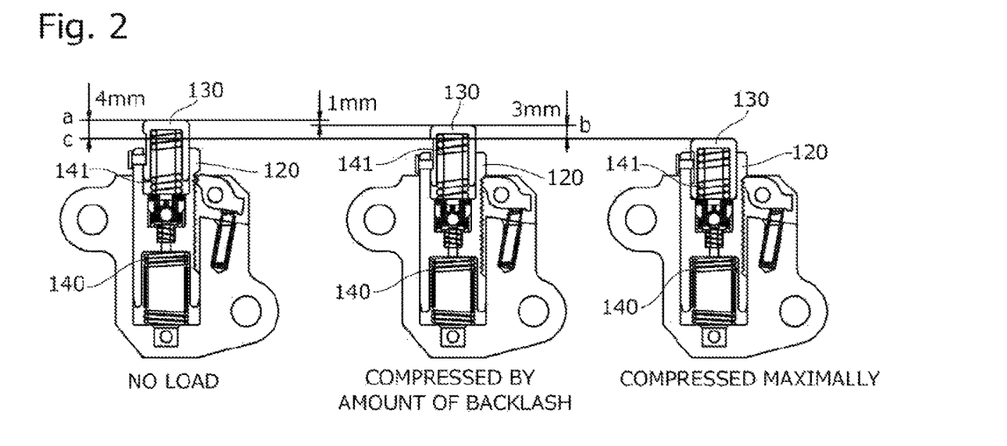
FIG. 2 is a diagram for explaining the operation of the chain tensioner according to the first embodiment of the present invention.

As shown in FIG. 2, when there is no load (engine being stopped), the distal end plunger 130 is pressed by the second coil spring 141 and advanced to its outermost position. The plunger 120 is also pressed by the coil spring 140 and advanced to a position corresponding to the chain position.

When tension is applied to the chain, the coil spring 140 with a smaller pressing force is compressed by an amount of backlash of the ratchet mechanism to cause the plunger 120 to retract.

As the tension increases, since the backward movement of the plunger 120 is stopped by the ratchet mechanism, the second coil spring 141 is pressed and compressed, so that the distal end plunger 130 retracts inside the distal end bore 121.

In this embodiment, the amount of backlash is set to be about 1 mm, while the stroke length of the distal end plunger 130 is set to be about 3 mm, so that the distal end plunger has a stroke length of a total of about 4 mm.

Figures 3A, 3B:
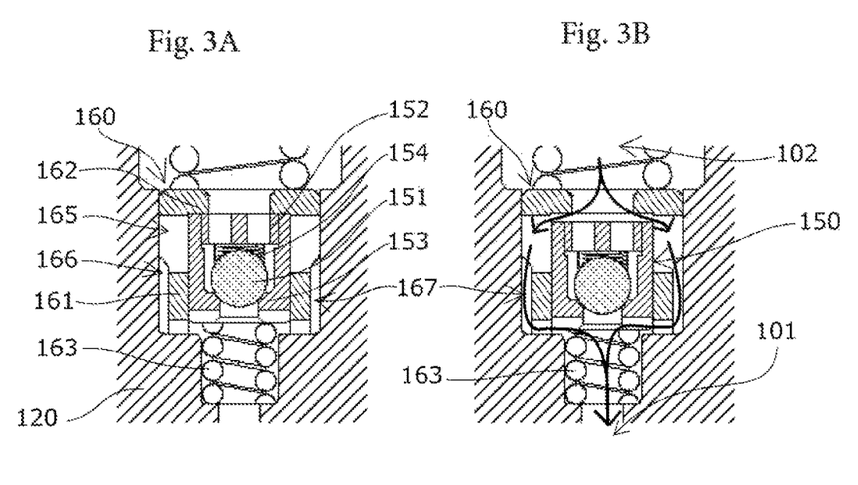
FIG. 3A and FIG. 3B are enlarged cross-sectional views of a first relief valve unit of FIG. 1.

The first relief valve unit 160 includes, as shown in FIG. 3A, a relief sleeve 161 that slidably holds the check valve unit 150 inside, a relief valve seat 162 that opens and closes as the check valve unit 150 slides, and a unit pressing spring 163 for pressing the check valve unit 150 toward the relief valve seat 162. One end of the unit pressing spring 163 is seated inside the plunger 120.

Optionally, a spring retainer that supports and fixes the unit pressing spring 163 may be fixedly attached to the relief sleeve 161.

The relief sleeve 161 includes, on the rear side of the relief valve seat 162, a relief hole 165 that is a relief part for letting out the oil that is released when the pressure reaches or exceeds a predetermined high level to the outer circumferential side. An oil circulation passage 166 having an orifice 167 is formed on one side of the relief hole 165 facing the oil pressure chamber 101.

The check valve unit 150 includes a check ball 151, a check valve seat 153 that opens and closes as the check ball 151 sits thereon and separates therefrom, a retainer 152 holding the check ball 151 inside the check valve seat 153, and a ball pressing spring 154 that lightly presses the check ball 151 toward the check valve seat 153.

The check valve seat 153 has a cylindrical outer shape and is configured to sit on the relief valve seat 162 of the relief valve unit 160.

How the chain tensioner 100 according to the first embodiment of the present invention configured as described above operates will be explained.

Oil is supplied from the oil supply hole 114 to the oil pressure chamber 101, and delivered to the second oil pressure chamber 102 via the check valve unit 150.

When the distal end plunger 130 moves outward inside the distal end bore 121, the oil in the oil pressure chamber 101 pushes the check ball 151 up from the check valve seat 153 and flows into the second oil pressure chamber 102.

When the distal end plunger 130 is pushed into the distal end bore 121, the pressure of the second oil pressure chamber 102 rises, so that the check ball 151 is pressed against the check valve seat 153, and the oil is stopped from flowing out of the check valve unit 150. The pressure then acts to press the check valve unit 150 itself downward against the pressing force of the unit pressing spring 163.

When the pressure of the second oil pressure chamber 102 reaches or exceeds the predetermined high valve opening pressure of the first relief valve unit 160, the unit pressing spring 163 is compressed and the entire check valve unit 150 retracts as shown in FIG. 3B and separates from the relief valve seat 162 of the first relief valve unit 160, so that the pressure of the second oil pressure chamber 102 is released, In this embodiment, as shown in the drawing, the relief valve seat 162 is formed in a concave shape, and closed by the check valve unit 150 that fits therein to a predetermined depth. With this structure, the pressure of the second oil pressure chamber 102 is released after the check valve unit 150 has retracted until it is disengaged, which means that pressure leakage when the valve is closed is minimized.

As the check valve unit 150 separates from the relief valve seat 162 to release the pressure of the second oil pressure chamber 102, the oil flows out of the second oil pressure chamber 102 through the relief hole 165, and through the orifice 167 in the oil circulation passage 166 on the outer circumferential surface of the relief sleeve 161, and thus the oil circulates back to the oil pressure chamber 101 without flowing out of the system.

When the pressure of the second oil pressure chamber 102 reduces to or below a predetermined level, the check valve unit 150 is moved by the unit pressing spring 163 and again sits on the relief valve seat 162, to keep the closed state and to maintain the pressure therein.

Since the pressure is released by the first relief valve unit 160 toward the oil pressure chamber 101 from which the oil is supplied in this structure, the pressure difference between the second oil pressure chamber 102 and the oil pressure chamber 101 is smaller as compared to structures wherein the pressure is released out of the system, and therefore the speed at which the relief valve unit 160 returns to its closed state is increased.

Even when the first relief valve unit 160 opens to release pressure, the amount of oil that flows out is limited by the orifice 167, so that a sudden pressure drop of the second oil pressure chamber, and a pressure buildup due to a further increase in engine oil pressure, are prevented, and a predetermined damping force is preserved.

When the pressure of the second oil pressure chamber 102 suddenly rises to or exceeds a predetermined high level, the contact pressure between the check ball 151 and the check valve seat 153 will increase rapidly.

If the pressure suddenly rises to or exceeds a predetermined high level in a state where the check ball 151 is not in contact with the check valve seat 153, the check ball 151 will collide against the check valve seat 153.

Since the check valve seat 153 retracts at this time, the impact caused by a sudden increase in the contact pressure or collision between the check ball 151 and the check valve seat 153 can be mitigated, so that deterioration of the check valve function due to damage to the check ball or check valve seat can be prevented.

Also, since the first relief valve unit 160 is integral with the check valve unit 150 as shown in FIG. 3A, and can be prepared in advance as a single component, the number of parts of the tensioner body 110 or the plunger 120 that need to be machined, and the number of process steps of assembling the chain tensioner 100 can be greatly reduced.

The second coil spring 141 that biases the distal end plunger 130 is designed to apply a larger pressing force than the coil spring 140 that presses the plunger 120, and when tension is applied to the chain, the coil spring 140 with a smaller pressing force is compressed to cause the plunger 120 to retract only by an amount of backlash of the ratchet mechanism, and the plunger is stopped from further retracting.

Therefore, the pressing force of the coil spring 140 is used to effect only the forward movement of the plunger 120 in accordance with elongation of the chain, while the backward movement of the plunger is restricted by the ratchet mechanism. During the driving, large tension fluctuations are absorbed only by the reaction forces and damping characteristics of the second coil spring 141 and the hydraulic pressure of the second oil pressure chamber 102, which are generated by the distal end plunger 130 moving back and forth inside the distal end bore 121.

Since elongation of the chain is dealt with by an advancing movement of the plunger 120, the volume of the second oil pressure chamber 102 and the compression amount of the second coil spring 141 are not affected by the chain elongation, and therefore an appropriate reaction force and damping characteristics can always be provided.

Embodiment 2

Figure 4:
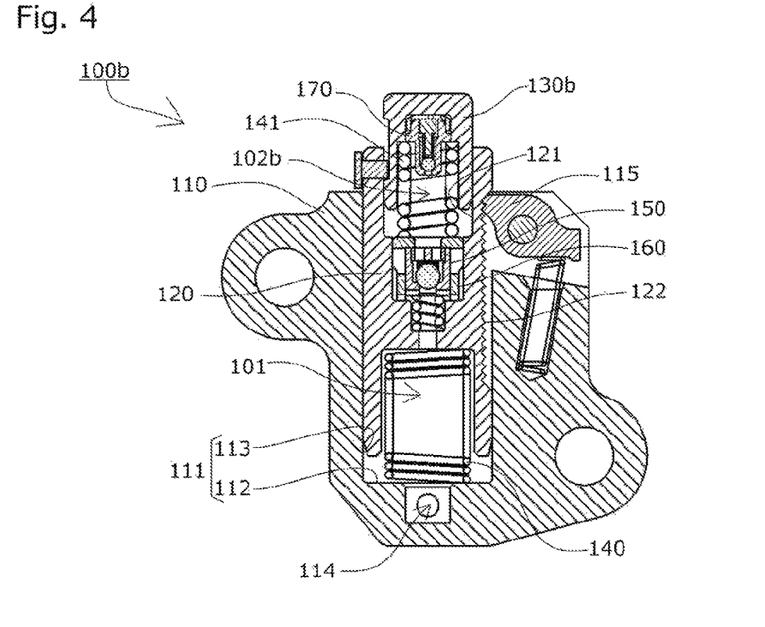
FIG. 4 is a cross-sectional view of a chain tensioner according to a second embodiment of the present invention.

The chain tensioner 100b according to a second embodiment of the present invention includes a second relief valve unit 170 provided to the distal end plunger 130b as shown in FIG. 4 for releasing pressure from the second oil pressure chamber 102b when it reaches or exceeds a predetermined high level.

The second relief valve unit 170 may be of any type. In this embodiment, a ball type relief valve is used.

The valve opening pressure of the second relief valve unit 170 is set higher than the valve opening pressure of the first relief valve unit 160.

The structure is otherwise the same as that of the first embodiment (the reference numerals being also the same).

In this embodiment, with the second relief valve unit 170 being provided, when the pressure of the second oil pressure chamber 102 remains at a high level of not less than the valve opening pressure of the first relief valve unit 160, and further rises and reaches or exceeds the valve opening pressure of the second relief valve unit 170 due to a further increase in the engine oil pressure, the second relief valve unit 170 opens, so as to release the oil from the second oil pressure chamber 102 near the distal end of the distal end plunger 130b.

When the pressure of the second oil pressure chamber 102 reduces to or below the valve opening pressure of the second relief valve unit 170, the second relief valve unit 170 closes, and keeps the closed state to maintain the pressure therein.

Figure 5:
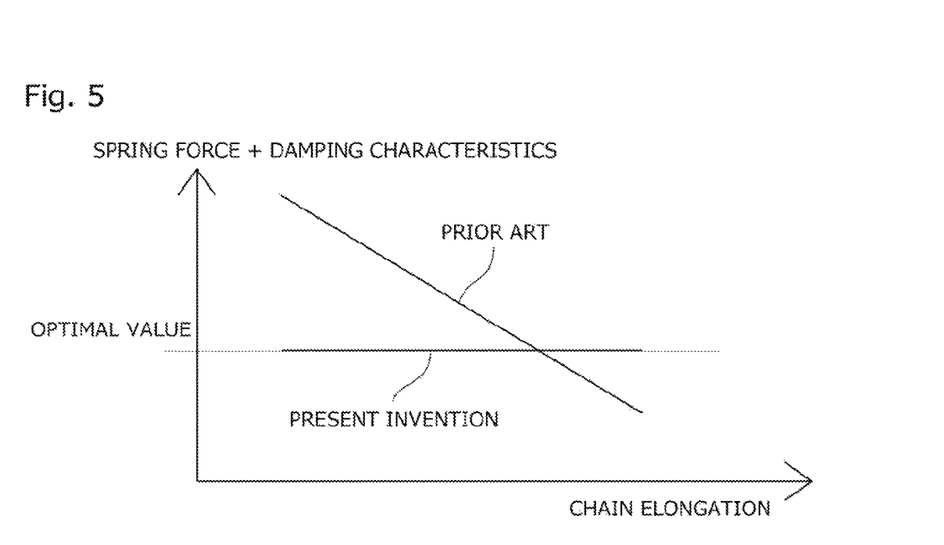
FIG. 5 is a diagram for explaining the characteristics of the pressing force exerted by the chain tensioner according to the present invention.

FIG. 5 shows the relationship between chain elongation and reaction force of the chain tensioner.

In a conventional chain tensioner, when the chain elongates, the plunger moves forward to change the volume of the oil pressure chamber, as well as causes the coil spring that provides the reaction force to extend.

When the chain elongates, the plunger advances, so that the amount of overlap between the plunger and the plunger bore is reduced. As the amount of oil flowing out from the oil pressure chamber through the gap is thereby increased, too, and oil retention is reduced, the reaction force is also reduced.

Therefore, the coil spring is designed to apply a reaction force that is larger than an optimal value when there is no elongation in the chain, so that the reaction force will be optimal at a later time point when the chain has undergone some elongation.

In the present invention, since the compression amount of the second coil spring 141 is not affected by chain elongation, the optimal value can be maintained constantly irrespective of the chain elongation.

Figure 6:
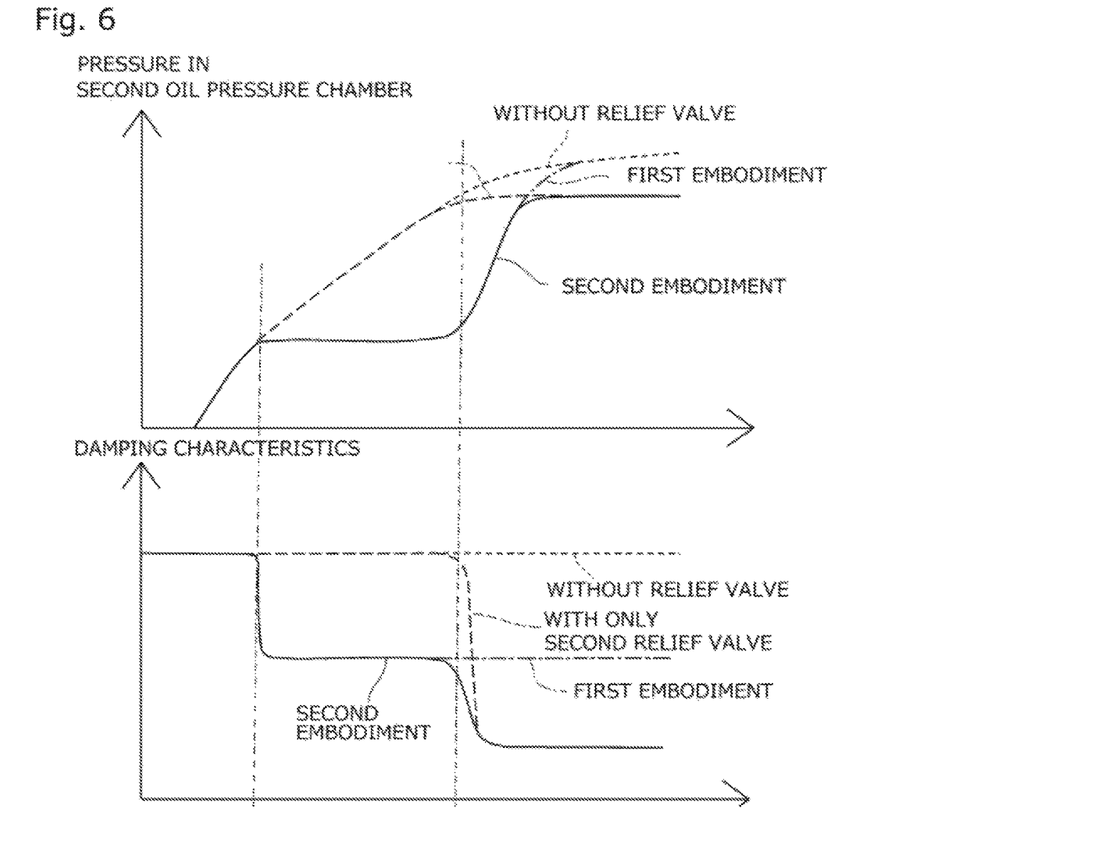
FIG. 6 is a diagram for explaining the damping characteristics of the chain tensioner according to the second; embodiment of the present invention.

FIG. 6 shows the relationship between the engine rpm, pressure in the second oil pressure chamber 102, and changes in the damping characteristics.

As the engine rpm increases, the pressure of oil being supplied rises, and so does the pressure in the second oil pressure chamber 102.

At the time when the engine rpm rises to point a in FIG. 6, the pressure in the second oil pressure chamber 102 reaches the valve opening pressure of the first relief valve unit 160, so that the first relief valve unit 160 opens.

The oil that flows out will travel via the orifice 167 of the oil circulation passage 166 back to the oil pressure chamber 101 that is where the oil was supplied from. At this time, the pressure in the second oil pressure chamber 102 does not drop and remains unchanged due to the hydraulic pressure applied to the oil pressure chamber 101 from the oil supply side.

Also, the damping characteristics do not drop more than a predetermined level because of a damping effect provided by the flow resistance of the orifice 167.

During a period between points a and b of the engine rpm in FIG. 6, the first relief valve unit 160 is open (and, in the second embodiment, the second relief valve unit 170 is closed), and the pressure in the second oil pressure chamber 102 and the damping force are maintained substantially at a predetermined level because of the orifice 167.

As the engine rpm approaches point b in FIG. 6, the pressure of the oil supplied from the engine is further increased so that the stabilizing effect by the orifice 167 is no longer achieved, as a result of which the pressure in the second oil pressure chamber 102 rises.

When the engine rpm rises to point b in FIG. 6, in the chain tensioner of the first embodiment that does not include the second relief valve unit 170, the pressure in the second oil pressure chamber 102 keeps rising, while the damping characteristics provided by the flow resistance of the orifice 167 are maintained.

In the second embodiment that has the second relief valve unit 170, when the pressure in the second oil pressure chamber 102 reaches the valve opening pressure of the second relief valve unit 170, the second relief valve unit 170 opens, so that the oil pressure is maintained at a predetermined level.

The damping characteristics are significantly lowered, since there is then only the damping effect provided by the flow resistance of the second relief valve unit 170.

When there is no relief valve at all, as indicated with a small dot line in FIG. 6, the pressure of the oil pressure chamber keeps rising with the increase in the engine rpm, while the damping characteristics remain constant at the initial high level.

In this case, it is not possible to achieve a correct pressure or damping force appropriate for a particular rpm.

If there is only the second relief valve unit 170, as indicated with a large dot line in FIG. 6, the pressure of the second oil pressure chamber keeps rising with the increase in the engine rpm until the engine rpm reaches point b in FIG. 6, while the damping characteristics remain constant at the initial high level. When the engine rpm reaches point b in FIG. 6, the pressure of the oil pressure chamber stops rising, and the damping characteristics drop largely.

With only the second relief valve unit 170, the rpm corresponding to the level at point b in FIG. 6 could be changed by adjusting the valve opening pressure, and therefore it would be possible to set an upper limit of the pressure of the oil pressure chamber in accordance with the rpm. Nevertheless, various levels of pressure and damping characteristics appropriate for a wide range of engine oil pressure levels cannot be achieved.

In contrast, according to the chain tensioner of the present invention, the pressure change points of the oil pressure chamber corresponding to the rpm can be adjusted by appropriately setting the valve opening pressure of the first relief valve unit 160, and the damping force when the first relief valve unit 160 opens can be adjusted by appropriately designing the orifice 167, so that the pressure of the oil pressure chamber can be maintained correctly corresponding to a wide range of engine oil pressure levels, and a desired reaction force and damping force corresponding to the rpm can be achieved.

While a specific example of the chain tensioner according to the present invention has been described in the embodiments above, the chain tensioner according to the present invention is not limited to these examples, and the shapes, positions, sizes, and positional relationships with each other of various constituent parts may be changed in various manners.

The chain tensioner of the present invention may not necessarily foe applied to a chain guide mechanism that uses a guide shoe for slidably guiding a transmission chain such as an endless roller chain passing over respective sprockets of a crankshaft and a cam shaft in an engine room, but may also be adopted in applications where the chain is slidably guided directly by the distal end of the plunger.

The chain tensioner may not necessarily be applied to a chain transmission mechanism but also used for similar transmission mechanisms that use belts, ropes and the like, and can be applied in a variety of industrial fields.

What is claimed is:

1. A chain tensioner comprising: a tensioner body having a cylindrical plunger bore with one open end; a cylindrical plunger slidably inserted in the plunger bore; and biasing means accommodated inside an oil pressure chamber formed between the plunger bore and the plunger such as to freely expand and contract and to urge the plunger in a projecting direction, wherein
    the plunger has a distal end bore that opens toward a distal end, and includes
    a cylindrical distal end plunger slidably inserted in the distal end bore, and distal end biasing means accommodated inside a second oil pressure chamber formed between the distal end bore and the distal end plunger such as to be able to expand and contract and to urge the distal end plunger in a projecting direction, and
    the chain tensioner further comprises
    a check valve unit that stops reverse flow of oil flowing from the oil pressure chamber into the second oil pressure chamber, and a first relief valve unit that releases oil toward the oil pressure chamber when pressure of the second oil pressure chamber reaches or exceeds a predetermined high level.

2. The chain tensioner according to claim 1, wherein the distal end biasing means has a larger pressing force than that of the biasing means, and
    the plunger is restricted from moving in a retracting direction by a ratchet mechanism.

3. The chain tensioner according to claim 1, wherein the check valve unit is disposed as a valve element of the first relief valve unit,
    the first relief valve unit and the check valve unit being formed integral with each other, and
    the first relief valve unit being disposed between the oil pressure chamber and the second oil pressure chamber with a relief valve seat thereof being oriented toward the second oil pressure chamber.

4. The chain tensioner according to claim 3, wherein an oil circulation passage formed between an outer circumference of the first relief valve unit and an inner surface of the plunger includes an orifice that restricts an amount of oil.

5. The chain tensioner according to claim 1, wherein the second oil pressure chamber is provided with a second relief valve unit that releases oil to outside when the pressure reaches or exceeds a predetermined high level,
    the second relief valve unit having a valve opening pressure that is higher than a valve opening pressure of the first relief valve unit.

* * * * *